(12) United States Patent
Ter Haar

(10) Patent No.: US 6,431,227 B1
(45) Date of Patent: Aug. 13, 2002

(54) ASEPTIC FILLING DEVICE

(75) Inventor: Robbert Hendrik Ter Haar, Springfield, MO (US)

(73) Assignee: Stork Food and Dairy Systems B.V. (NL)

(*) Notice: Subject to any disclaimer, the term of this patent is extended or adjusted under 35 U.S.C. 154(b) by 0 days.

(21) Appl. No.: 09/709,218

(22) Filed: Nov. 9, 2000

(30) Foreign Application Priority Data

Oct. 2, 2000 (NL) .............................. PCT/NL00/00704

(51) Int. Cl.[7] .............................. B65B 43/42; B67C 3/00
(52) U.S. Cl. .................. 141/168; 141/89; 141/91; 141/92; 141/129; 141/169; 141/176
(58) Field of Search .................. 141/89–93, 97, 141/129, 168, 169, 170, 172, 176, 180, 190, 191, 48, 63; 198/345.2

(56) References Cited

U.S. PATENT DOCUMENTS

| | | | |
|---|---|---|---|
| 3,613,746 A | * 10/1971 | Smith | 141/11 |
| 4,289,228 A | 9/1981 | Reim et al. | |
| 4,506,489 A | 3/1985 | Schieser et al. | |
| 5,385,003 A | 1/1995 | Nixon, Jr. et al. | |
| 6,179,017 B1 | * 1/2001 | Walter | 141/90 |
| 6,209,591 B1 | * 4/2001 | Taggart | 141/89 |

FOREIGN PATENT DOCUMENTS

| | | |
|---|---|---|
| EP | 0 286 514 A1 | 10/1988 |
| EP | 0 342 690 A1 | 11/1989 |
| EP | 0 434 412 A1 | 6/1991 |
| EP | 0 475 827 A1 | 3/1992 |

* cited by examiner

*Primary Examiner*—Timothy L. Maust
(74) *Attorney, Agent, or Firm*—Hoffmann & Baron, LLP

(57) ABSTRACT

A device for filling containers with free-flowing products under aseptic conditions comprises a conveyor system for intermittently conveying the containers along a conveyor path past appropriate filling stations in separate compartments inside a housing. The conveyor system comprises a guide assembly for guiding at least two carriers which interact with one another in order to position and retain containers, and a pusher mechanism with a chainless drive for displacing the carriers in the guide assembly each time, a container guide, which is arranged beneath the conveyor path of the containers, for supporting the containers, and a blocking device for temporarily blocking the movement of the carrier which is situated at the outlet of the device during operation.

9 Claims, 5 Drawing Sheets

ASEPTIC FILLING DEVICE

FIELD OF THE INVENTION

The present invention relates to a device for filling containers with free-flowing products, in particular liquid foodstuffs with a limited shelf life, under aseptic conditions, comprising a housing with an inlet for containers which are to be filled and with an outlet for filled containers, a plurality of separate compartments, which are arranged inside the housing and comprise at least a sterilization compartment with sterilization station and a filling compartment with filling station, and a conveyor system, which is arranged inside the housing, for intermittently conveying the containers, along a conveyor path past the appropriate filling stations in the compartments, adjacent compartments being separated from one another by a partition with at least one passage opening for the containers to pass through.

BACKGROUND OF THE INVENTION

A device of this nature, which is also known as a linear filler, to distinguish it from rotary filling devices, is known, for example, from EP-A-0 342 690 as a so-called "fill-and-pack in a non-germ atmosphere machine". In this known device, the conveyor system comprises two separate conveyor devices. In a sterilization zone, the containers are conveyed with the aid of carriers, which carriers are fixedly connected to chains arranged on either side of the conveyor path, while in a subsequent filling zone the containers, which rest by means of an upper flanged edge on parallel guides, are moved onwards with the aid of one or more rod mechanisms which comprise a toothed comb element.

In general, the containers have to be filled under aseptic conditions, on account of the risk of the containers or the product with which the containers are to be filled being affected or contaminated, in whatever form, with all the associated risks to the health of the (end) user. Therefore, it is customary to apply a slight superatmospheric pressure in the filling zone, so that it is impossible for any unpurified air to enter the filling zone from the outside or from the sterilization zone. The conveyor system can generally also be used to guide the carriers together with containers past any other processing stations, for example a container-closing station which adjoins the filling station and in which, for example, containers in the form of bottles are provided with a cap.

One of the drawbacks of using chains as a component of a conveyor system which is used in particular in the foodstuffs industry is that they are difficult to clean and sterilize, and consequently inspection services and other licensing authorities view and consider the use of chains in aseptic environments with considerable suspicion and distrust. Inevitable particles worn off the chains as a result of use exacerbate this problem. In addition, chains have the drawback that if one of the chains is no longer functioning correctly, for example if it breaks, the entire machine comes to a standstill in order to allow repair work to be carried out.

Another problem which occurs in conventional filling devices when switching from one type of container to a different type of container is that the aseptic conditions are lost and consequently, after the device has been reset in order to allow the different type of container to be filled, a relatively long preparation time is still required in order to recreate the aseptic conditions.

The object of the invention is to avoid the abovementioned drawbacks and to provide solutions to the above problems.

SUMMARY OF THE INVENTION

In the device according to the invention, for this purpose the conveyor system for intermittently conveying the containers from the inlet to the outlet comprises a guide assembly for guiding at least two carriers for carrying one or more containers, at least one cutout for positioning and retaining a container being provided in mutually facing longitudinal edges of adjacent carriers, and a pusher mechanism with a chainless drive for displacing the carriers in the guide assembly each time, a container guide, which is arranged beneath the conveyor path of the containers, for supporting the containers, and a blocking device for temporarily blocking the movement of a carrier which is situated at the outlet during operation.

The filling device according to the invention comprises a pusher mechanism which is driven without chains for intermittently displacing carriers in a guide assembly. A pusher mechanism of this nature can be arranged outside the usual sterilization zone of the filling device, so that during operation only the carriers and the containers to be filled have to be sterilized. The use of separate carriers which are displaced along or in the guide assembly has the further advantage that if one carrier or a container accommodated therein becomes defective, only that one carrier has to be removed and/or replaced. Therefore, the standstill time and the ease of repair are considerably improved. Furthermore, the use of separate carriers offers the advantage that the device is suitable for filling a plurality of types of container, for example containers of a different shape or different volume. When changing over from one type of container to another type of container with a different cross section, it is merely necessary to replace the carriers, resulting in relatively short changeover times. A set of two carriers which are used in the device according to the invention are provided, on the mutually facing longitudinal edges, with at least one cutout. Two opposite cutouts of adjacent carriers interact with one another in such a way that, when the pusher mechanism at the beginning of the conveyor path and the blocking device at the end of the conveyor path have been activated and the carriers are held between them, they clamp a container in place. The blocking device also has the function of preventing a carrier which is situated at the outlet from being pushed out of the guide assembly, so that it will instead be retained. The device according to the invention will usually employ a large number of carriers, of which both longitudinal edges are provided with one cutout, and preferably a plurality of cutouts. The container guide, which extends from the beginning of the conveyor path to its end, ensures that the containers are engaged of at the correct height and that in the unclamped state the containers do not fall onto the ground. The containers may be bottles, made from glass or plastic, cardboard or metal packages, such as packs and cans. The containers themselves are in no way limited to a specific shape or size. The shape of a cutout in a carrier is adapted to the shape of the container to be filled, which may be round, square, rectangular, oval, etc.

It should be noted that EP-A-0 475 827 has per se disclosed a conveyor device for conveying carriers holding a container, which is guided past a plurality of treatment stations, wherein a drive in the form of a connecting-rod mechanism with a roller (système bielle-galet) is used.

Furthermore, it should be noted that the carriers used in the invention are already known per se from EP-A-286 514, in which carriers which interact with one another, referred to in the said patent as "demi-plaques", are pivotably attached to two independent chain systems.

The pusher mechanism with a chainless drive which is used in the device according to the invention may be a servo-controlled motor with an eccentric arm which executes a reciprocating movement each time. It is advantageous to use a piston/cylinder assembly which is arranged at the beginning of the conveyor path of the conveyor system at the inlet of the device and the piston of which can move to and fro in the machine direction. The piston/cylinder assembly may be of either the pneumatic or the hydraulic type. Preferably, the stroke length of the piston/cylinder assembly is equal to the dimension of the carrier, as seen in the longitudinal direction of the conveyor path (i.e. the machine direction). In this way, during operation a carrier is in each case advanced by one position from the beginning of the conveyor path, past the sterilization station and then the filling station, towards the end of the conveyor path of the conveyor assembly. At each intermediate stopped position, additional treatments or operations can be carried out, as will be explained in more detail below.

The blocking device advantageously comprises two piston/cylinder assemblies which are arranged on either side of the conveyor path. This arrangement leaves sufficient space at the end of the conveyor path to allow the containers and/or carriers to be removed.

The carriers are advantageously made from plastics material, such as polypropylene, which allows simple, repeated sterilization. Stainless steel is another suitable carrier material. In the aseptic zone, which covers at least part of the sterilization zone and the entire filling zone, the carriers advantageously form part of the physical boundary of this zone. In other words, in the relevant section of the conveyor path, the carriers, together with the guides, form a separation between the aseptic zone and the surrounding environment where aseptic conditions do not prevail. Since the carriers and containers are constantly resterilized in the sterilization compartment, the sterility of the aseptic zone is maintained. This also applies when changing over to a different type of container and/or a different product.

To ensure that the carriers can be displaced in a regular and smooth manner without shocks or other irregularities along or in the guides, preferably at least those parts of the guides which come into contact with the carriers are provided with a wear-resistant slip layer, for example a layer of Teflon.

A slip layer of this nature may also be provided on the container guide, the height of which is preferably adjustable. Thus, in the device according to the invention the height can be adapted to the type of containers to be filled.

Advantageously, the device is provided, at a position between the end where the pusher mechanism is arranged and the sterilization station, with a carrier-introduction station for introducing a carrier into the conveyor system and receiving the one or more containers in a carrier. This carrier-introduction station is preferably arranged outside the compartment where the sterilization station is located. Examples of a suitable carrier-introduction station include a lifting platform which is arranged beneath the conveyor path, a sliding mechanism which is arranged next to the conveyor path, for introducing carriers from the side, or a dropping device which is arranged above the conveyor path, for in each case dropping a carrier onto the guides of the conveyor system.

The carriers and containers which are to be filled are sterilized using conventional sterilization means, for example a disinfectant, such as hydrogen peroxide, hot air, UV radiation or a combination of two or more of these techniques.

Adjoining the filling station there will often be a container-closing station where the containers are closed as a function of the type of container and the material from which it is made, for example with a cap or by means of hot-welding of an aluminium closure foil, or another suitable closure method, if appropriate followed by a reclosable cover or cap. These operations are also carried out under aseptic conditions, and consequently the container-closing station will also be accommodated in the aseptic zone.

At the end of the conveyor path, outside the aseptic zone, there will usually be a carrier-removal station where the containers are removed from the carriers and, for example, transferred to other carriers, for example crates or boxes, and then the carriers are removed from the conveyor path and returned to the carrier-introduction station. For this return of the carriers, it is preferable to provide a second conveyor system which is arranged beneath the first conveyor system. This second conveyor system may be suitable for moving the carriers one by one, but also for moving a plurality of carriers stacked on top of one another.

BRIEF DESCRIPTION OF THE DRAWING

The invention is explained below with reference to the appended drawing, in which.

DETAILED DESCRIPTION OF PREFERRED EMBODIMENTS

Figure 1:
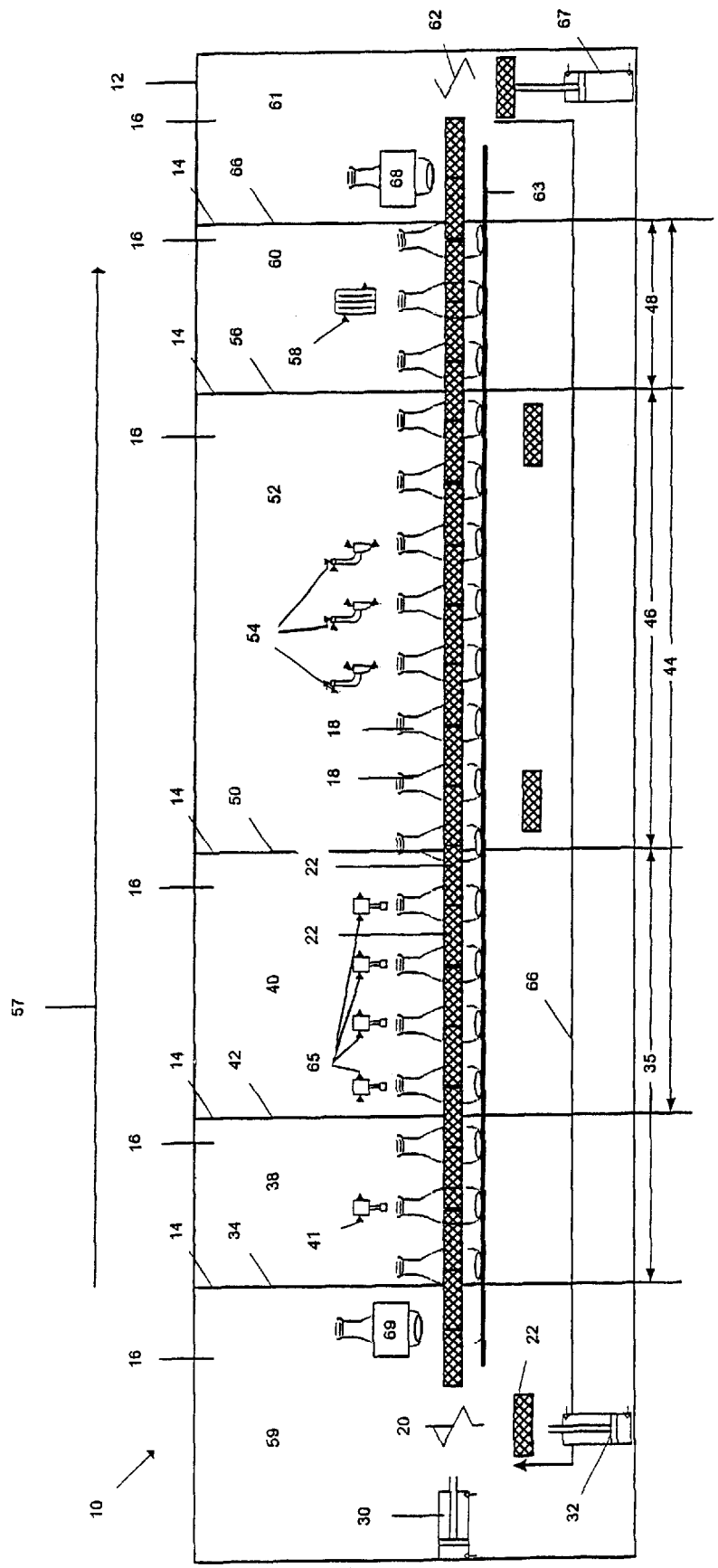
FIG. 1 shows a diagrammatic view of an embodiment of a filling device according to the invention.
Figure 2:
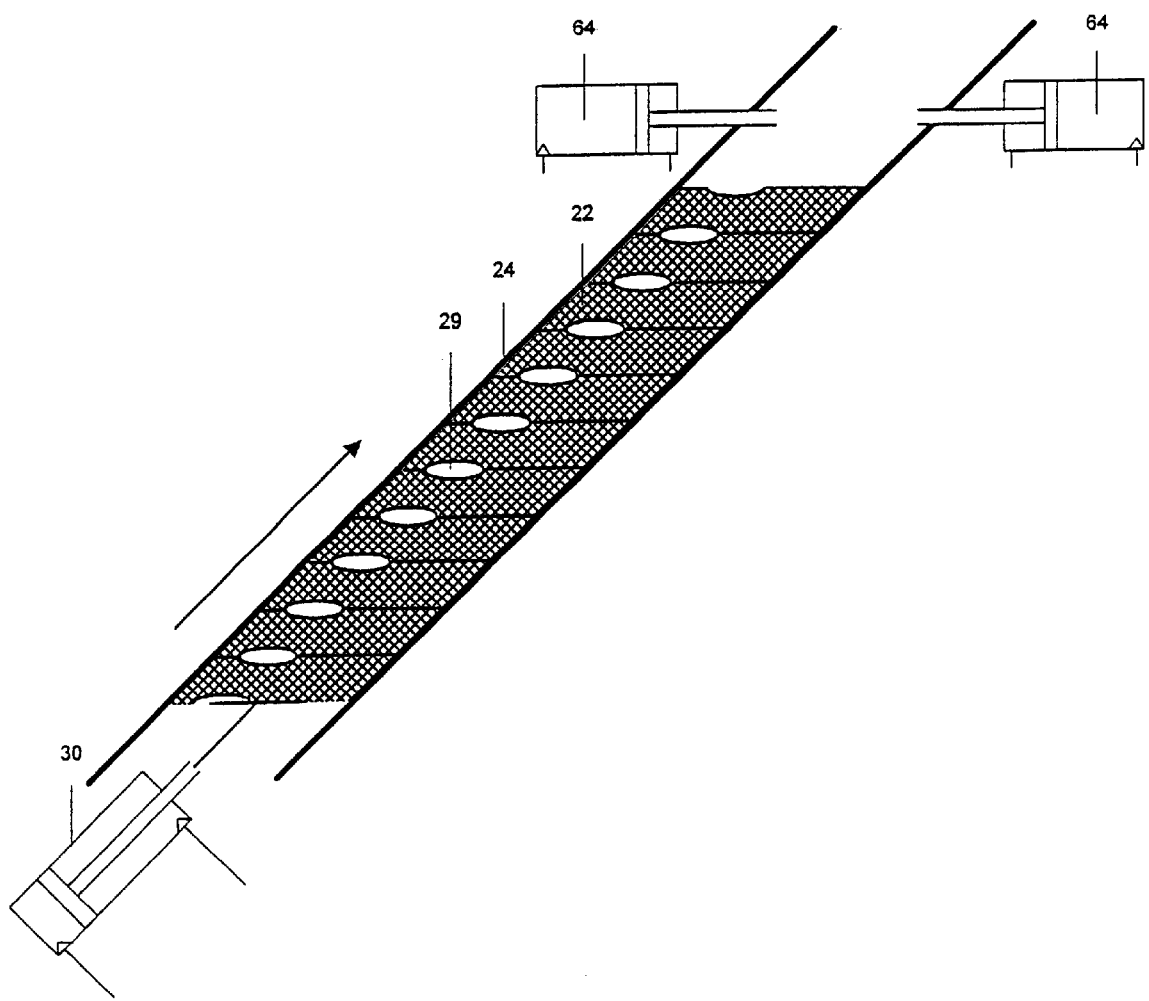
FIGS. 2–8 illustrate details of the embodiment shown in FIG. 1.
Figure 3:
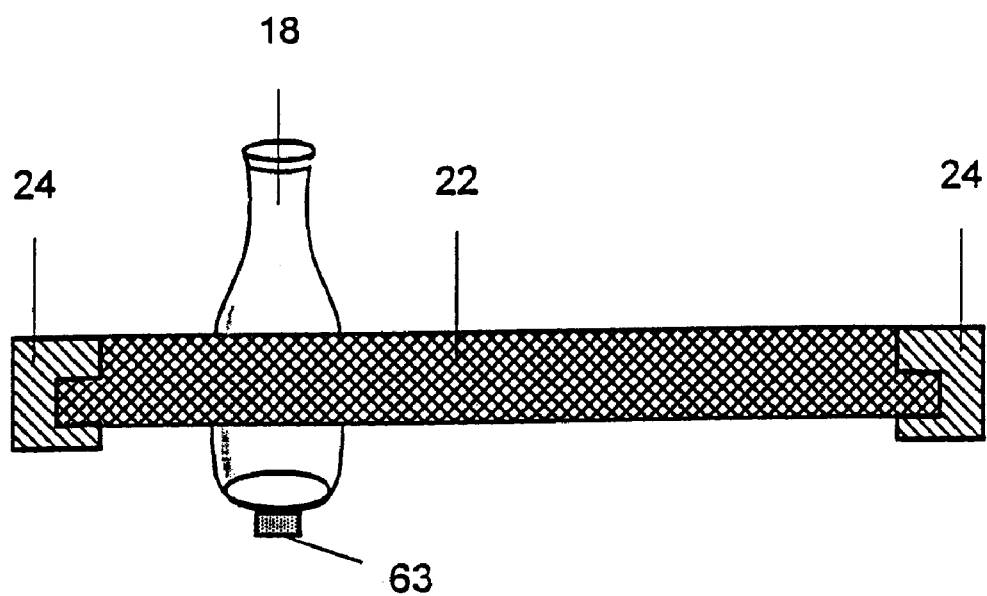

In FIG. 1, a linear filling device is denoted overall by reference numeral 10. The running direction of the machine is denoted by a long arrow 57. The filling device 10 comprises a housing 12 in which there are a number of compartments 16 separated by vertical partitions 14. The various operations and processing steps are carried out in these compartments.

Figure 4:
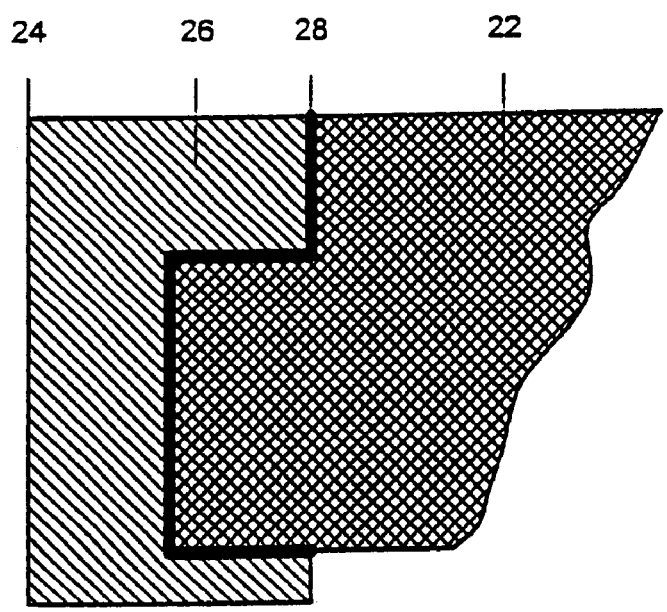
Figure 5:
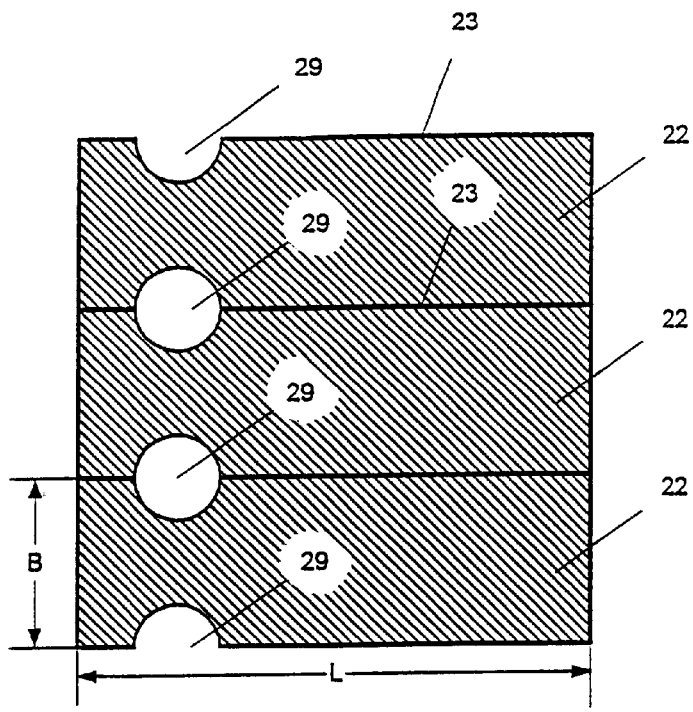

In the situation illustrated, one or more containers 18, in this case bottles, are introduced via an introduction opening (not shown) in the housing 12, into an introduction station for containers and carriers which is denoted overall by reference numeral 20, and are positioned in a carrier 22. A carrier 22 is then resting on parallel guides 24 (see FIGS. 2–5) of a conveyor system for intermittently displacing the carriers 22 along a straight conveyor path, which is defined by the guides 24, through the various compartments 16 and past various processing/treatment stations. The guides 24 comprise stainless steel U-sections 26, the inner side of which—which comes into contact with a carrier 22—is provided with a Teflon slip layer 28 (FIG. 4). A carrier 22 comprises an elongate plate, the length L of which (in the transverse direction) and the width B of which (in the machine direction) are indicated in FIG. 5. As the figures show, a carrier 22 is provided on both longitudinal edges 23 (the front and rear edges as seen in the machine direction) with a cutout 29. The cutout in a front edge of a first carrier and the cutout in the rear edge of the adjoining, downstream carrier clamp a container 18 securely in place. It will be understood that, if desired, a plurality of cutouts 29 may be provided in a row in the longitudinal edges 23 of a carrier 22.

At the beginning of the conveyor path there is a piston/cylinder assembly 30, the piston of which can execute a stroke corresponding to the width B of a carrier 22 in the machine direction. At the end of the conveyor path, piston/ cylinder assemblies 64 are arranged on either side of this path (FIG. 2), which assemblies function as a blocking device.

Referring once again to FIG. 1, a carrier 22 is delivered from a collection or storage position arranged beneath the conveyor path, with the aid of a lifting platform 32, for example a piston/cylinder assembly, the piston head of which is provided with parallel profiled sections identical to the guides 24, and is moved one stroke in the machine direction by the piston/cylinder assembly 30. At the same time as this forward movement of a carrier 22, a container 18 is moved downwards with the aid of a container-introduction device 69, until this container 18 comes into contact with a container guide 63 beneath it. At this time, the carrier 22 is pressed against a carrier 22 lying in front of it, so that the container 18 is clamped at the correct height and is positioned in the interacting cutouts 29 of the adjacent carriers 22. Then, the piston of the piston/cylinder assembly 30 is retracted again and the next cycle of operations for introducing carrier 22 and container 18 is carried out.

Figure 6:
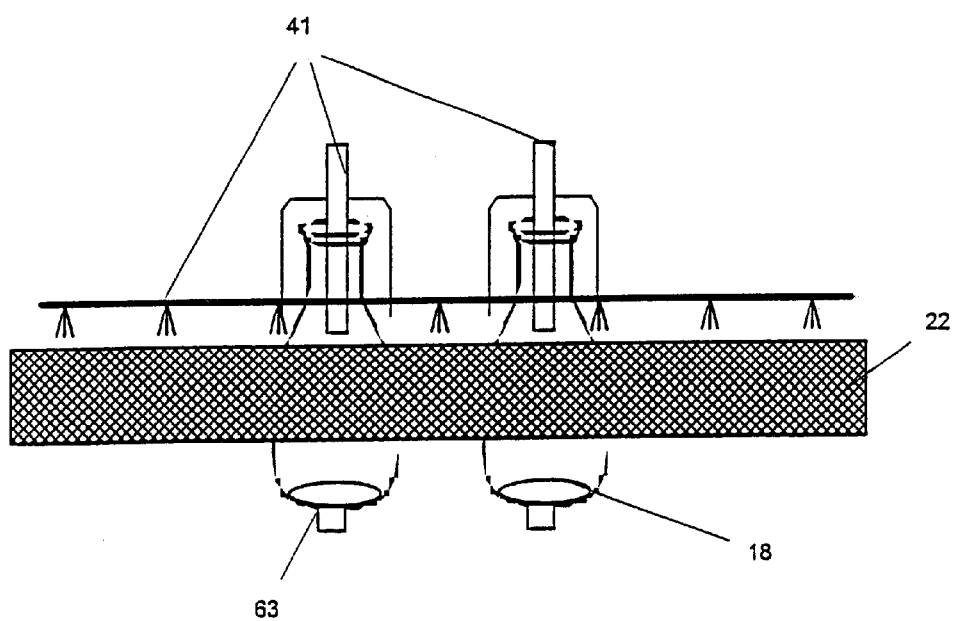
Figure 7:
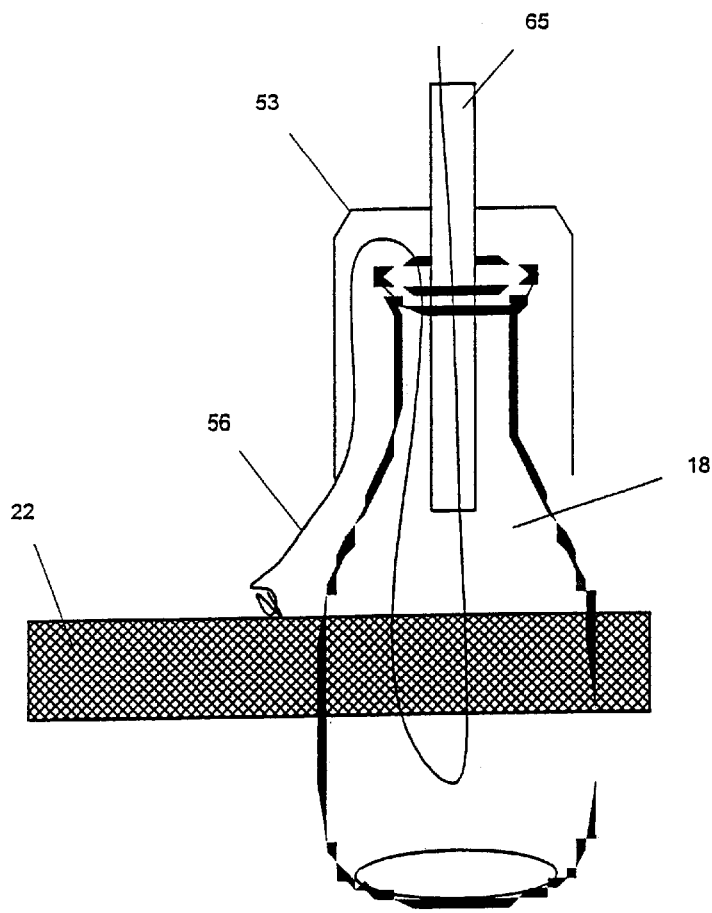
Figure 8:
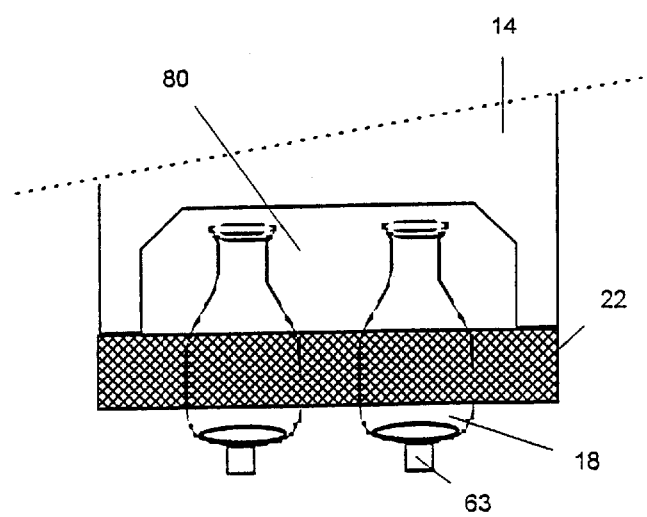

While a newly introduced carrier is being pushed through, the other carriers 22 which are already on the guide assembly 24 are each time advanced by one position. In this way, a carrier 22 together with container 18 is moved through a passage 80 (see FIG. 8) in partition 34 into the sterilization zone 35 in order for both the carriers 22 and the containers 18 to be sterilized. The sterilization zone 35 comprises two sub-components 38 and 40, which are separated from one another by an additional vertical partition 42, which partition 42 delimits the start of an aseptic zone 44. This aseptic zone 44 comprises sub-compartment 40 of the sterilization zone 35, an entire filling zone 46 and a further processing zone 48. The carriers 22 form the physical limits on the underside of the aseptic zone 44. In sub-compartment 38 there is a sterilization station 41 where the carriers 22 and containers 18 are sterilized with a disinfectant, for example $H_2O_2$, as a result of the disinfectant being sprayed onto the carriers 22 and into and around the containers 18, which may take place in a plurality of steps, depending on the shape of the container and the materials used for the containers and carriers. See also FIG. 6. In sub-compartment 40, the carriers 22 and containers 18 are then dried with purified hot air with the aid of drying nozzles 65. The drying may also be carried out in one or more steps. The drying nozzles 65 are arranged so that they can be moved in the vertical direction and are provided with a deflecting screen 53. The stream of hot, sterilized air which is blown into a container by a drying nozzle 65 then flows out and is guided along the outside of the container 18 by the deflection screen 53 and then over the carrier 22. See FIG. 7.

Via a passage 80 in the partition 50, the carriers 22 together with containers 18 enter the filling zone 46 which is situated in compartment 52. Here, there is a filling station 54 with filling valves, the number of which in the transverse direction corresponds to the number of containers 18 in a row of the carrier 22, and which valves are in communication, via suitable metering means, with a reservoir for the product with which the containers 18 are to be filled, for example a dairy product. The filling may be carried out in one or more steps as a function of factors such as the product viscosity and the volume of the container 18.

Via a passage 80 in the partition 56, the carriers 22 together with containers 18 enter further processing zone 48, where a closing station 58 for fitting a cap to the bottle-shaped containers 18 is situated in a compartment 60. Adjoining this compartment 60, the device 10 comprises a carrier-removal station 62, which is separated from compartment 60 by a partition 66 with passage 80. In the carrier-removal station 62, the containers 18 are removed from the carriers 22 with the aid of a container-removal device 68, and the carriers 22 are lowered via a lifting platform 67 and are then returned to the first lifting platform 32 via a second conveyor system 66, which may be identical to the first conveyor system of guides 24 and piston/cylinder assembly 30.

The different processing operations in the various compartments are carried out whenever a container 18 is in the correct position and is not moving, in other words when it is clamped inside the cutouts 29 of adjoining carriers 22, which in turn are positioned at the beginning and end of the conveyor path as a result of actuation of the piston/cylinder assemblies 30 and 64.

What is claimed is:

1. Device for filling containers with free-flowing products under aseptic conditions, comprising a housing with an inlet for containers which are to be filled and with an outlet for filled containers, a plurality of separate compartments, which are arranged inside the housing and comprise at least a sterilization compartment with sterilization station, a filling compartment with filling station, and a conveyor system, which is arranged inside the housing, for intermittently conveying the containers from the inlet to the outlet, along a conveyor path past the stations in the compartments, adjacent compartments being separated by a partition with at least one passage opening for the containers to pass through, wherein the conveyor system for intermittently conveying the containers from the inlet to the outlet comprises a guide assembly for guiding at least two carriers for carrying containers, mutually facing longitudinal edges of adjacent carriers being provided with at least one cutout for positioning and retaining a container, and a pusher mechanism with a chainless drive for displacing the carriers in the guide assembly each time, a container guide, which is arranged beneath the conveyor path of the containers, for supporting the containers, and a blocking device for temporarily blocking the movement of a carrier which is situated at the outlet during operation.

2. Device according to claim 1, wherein the pusher mechanism comprises a piston/cylinder assembly which is arranged in the vicinity of the inlet.

3. Device according to claim 2, wherein the stroke length of the piston/cylinder assembly is equal to the dimension of the carrier, as seen in the conveying direction.

4. Device according to claim 1, wherein the blocking device comprises piston/cylinder assemblies arranged on either side of the conveyor path.

5. Device according to claim 1, wherein the height of the container guide is adjustable.

6. Device according to claim 1, wherein the carriers are made from plastics material.

7. Device according to claim 1, wherein the guides comprise a wear-resistant slip layer.

8. Device according to claim 1, wherein the device furthermore comprises a carrier-introduction station for introducing a carrier into the conveyor system and receiving the one or more containers in the carrier, a container-closing station and a carrier-removal station for removing the one or more filled containers and emptied carriers.

9. Device according to claim 1, wherein the device is provided with a second conveyor system which is arranged beneath the conveyor system, for returning the carriers from the carrier-removal station to the carrier-introduction station.

* * * * *